Dec. 22, 1953  G. T. BYNUM  2,663,424
CENTRIFUGAL OIL FILTER CONSTRUCTION
Filed Nov. 19, 1951  5 Sheets-Sheet 1

INVENTOR.
GEORGE T. BYNUM
BY Bodell & Thompson
ATTORNEYS

Dec. 22, 1953  G. T. BYNUM  2,663,424
CENTRIFUGAL OIL FILTER CONSTRUCTION
Filed Nov. 19, 1951  5 Sheets-Sheet 2

_FIG_2_

INVENTOR.
GEORGE T. BYNUM
BY Bodell & Thompson
ATTORNEYS

Dec. 22, 1953  G. T. BYNUM  2,663,424
CENTRIFUGAL OIL FILTER CONSTRUCTION
Filed Nov. 19, 1951  5 Sheets-Sheet 4

INVENTOR.
GEORGE T. BYNUM
BY Bodell & Thompson
ATTORNEYS

Patented Dec. 22, 1953

2,663,424

UNITED STATES PATENT OFFICE 2,663,424

CENTRIFUGAL OIL FILTER CONSTRUCTION

George T. Bynum, Liverpool, N. Y., assignor to Aircooled Motors, Inc., Syracuse, N. Y., a corporation of New York Application November 19, 1951, Serial No. 256,991

11 Claims. (Cl. 210—68)

1

This invention relates to oil filters as, for instance, for filtering the lubricating oil of internal combustion engines, and has for its object an oil filter in which the lubricating oil is forced through a centrifugal power actuated oil filter drum by a power actuated impeller, both the impeller and the oil drum being mounted on a power or engine actuated shaft within a casing formed with compartments in which the impeller, the oil drum, and also an entrance compartment are housed.

One of the objects of the invention is the arrangement of the power actuated shaft, and the entrance, impeller and filter drum compartments in series in the casing.

A further object is the concentric arrangement of a series of filter chambers in the filter drum through which some of the oil is by-passed. Another feature is the arrangement of the entrance compartment of the casing and means therein for splitting and distributing the incoming oil into two streams and directing it axially into the impeller compartment, and also the arrangement of outlet passages for the impeller compartment whereby the oil is directed radially inward and distributed to an outlet passage around the shaft, which outlet passage opens into a main central tubular outlet of the filter drum.

The invention consists in the novel features and in the combinations and constructions hereinafter set forth and claimed.

In describing this invention, reference is had to the accompanying drawings in which like characters designate corresponding parts in all the views.

Figure 1:
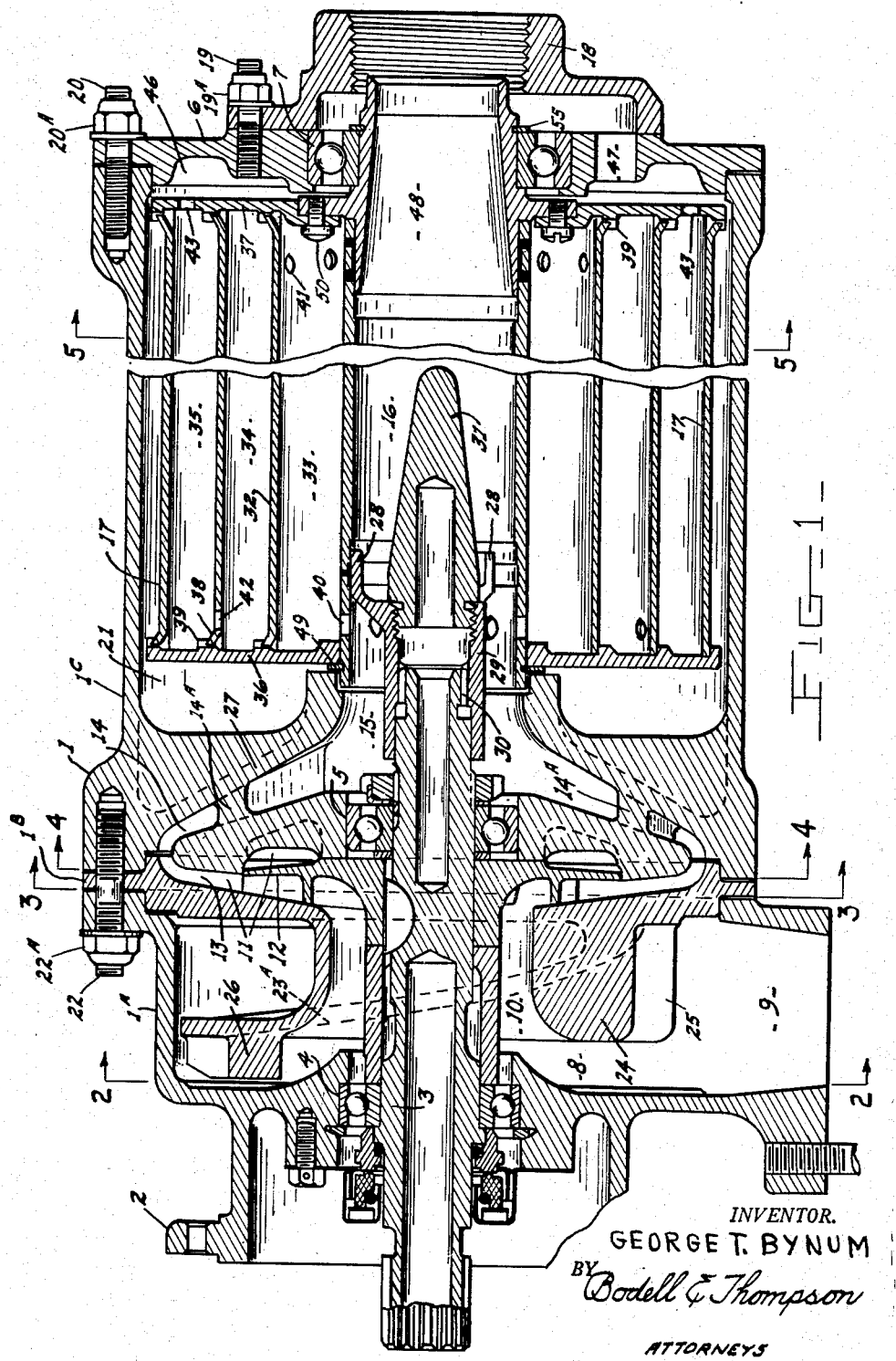
Figure 2:
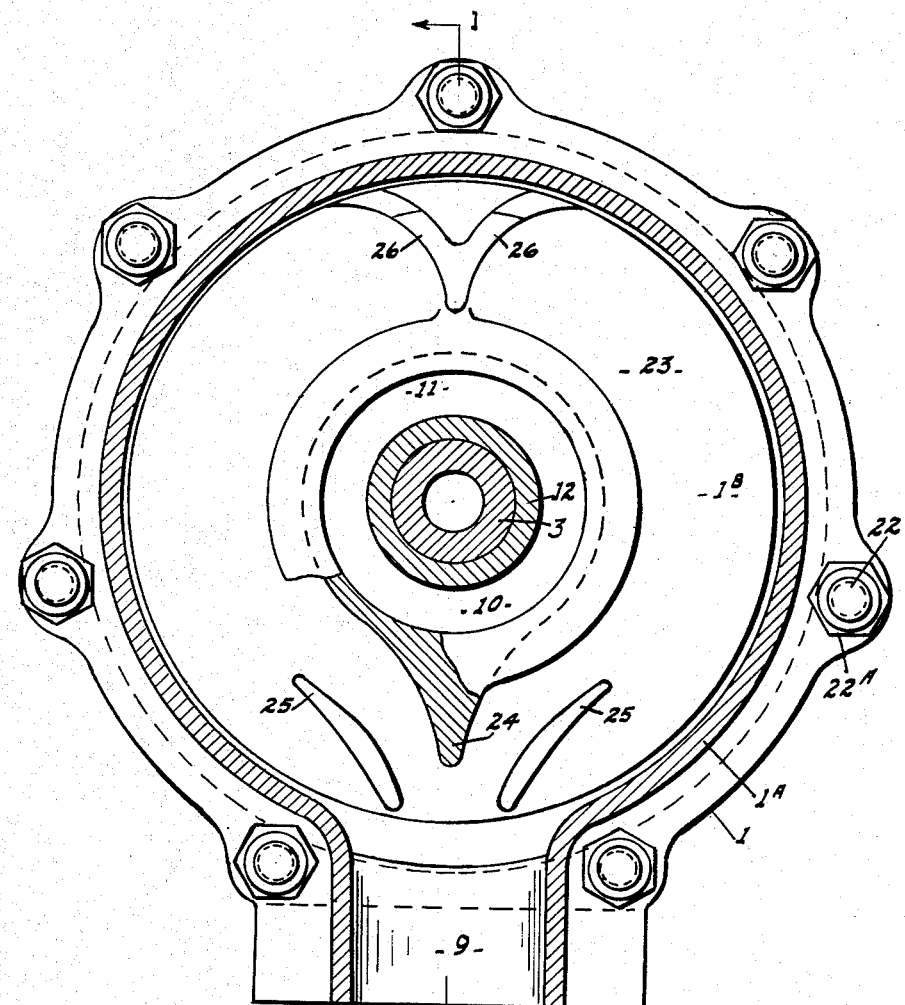
Figure 3:
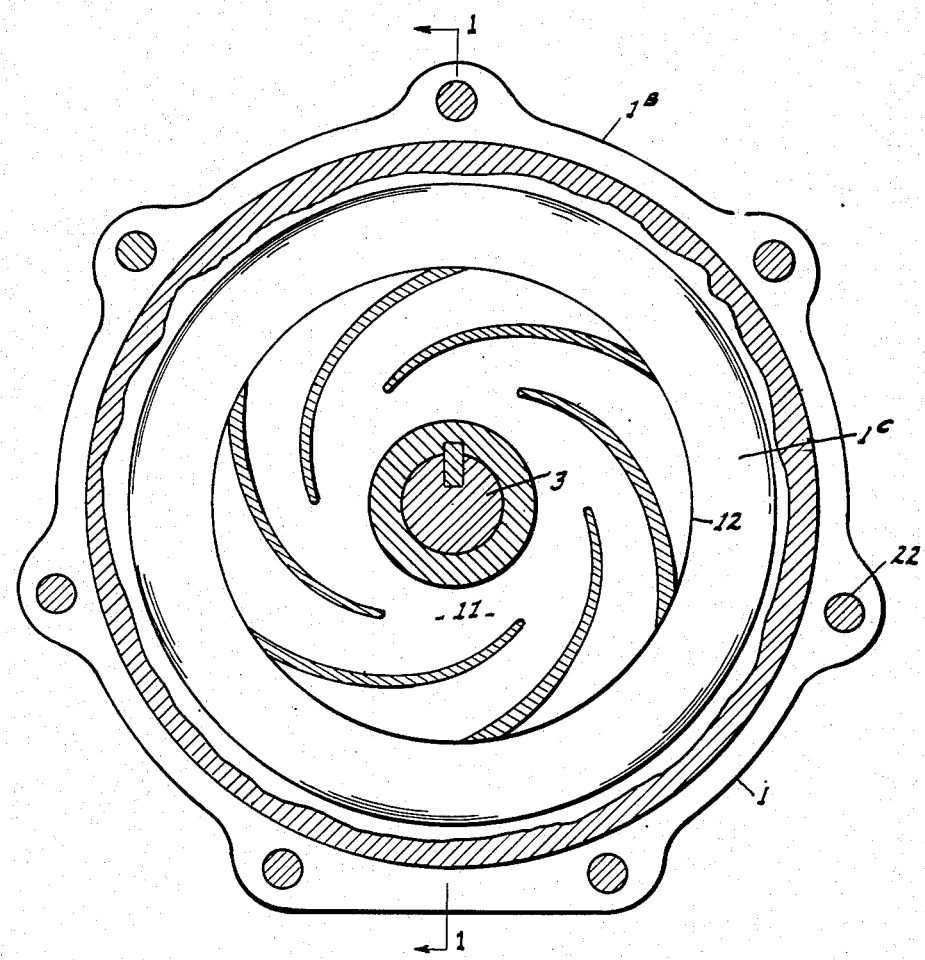
Figure 4:
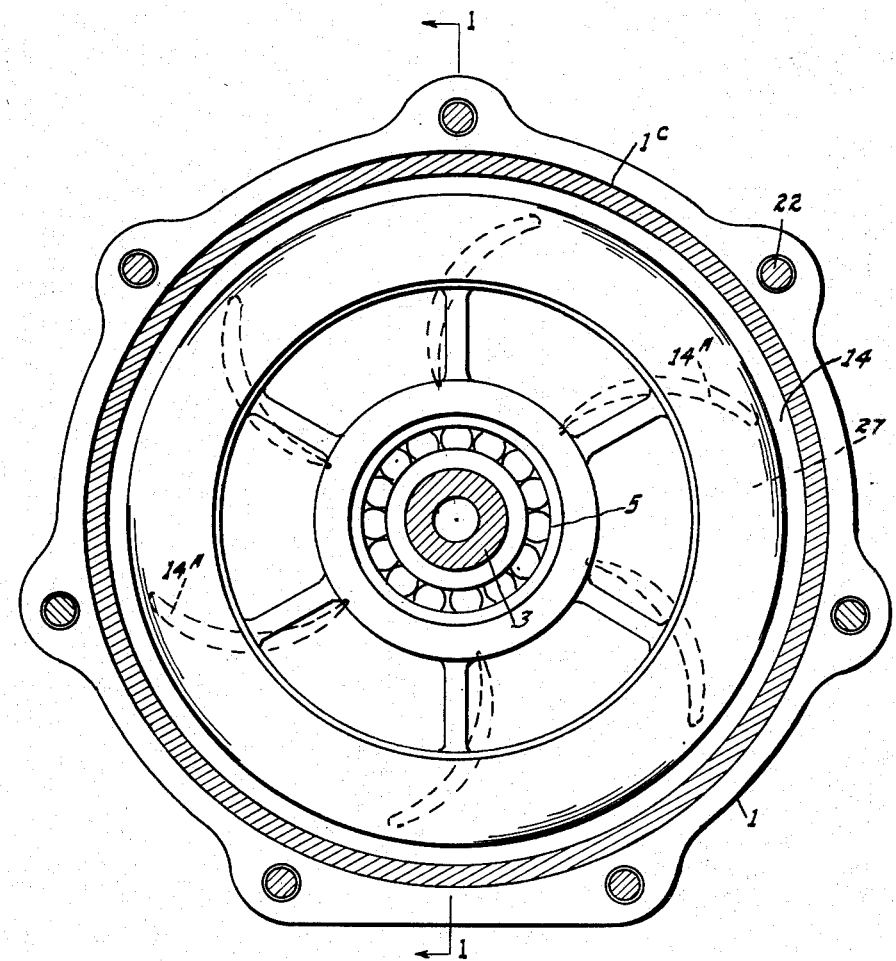
Figure 5:
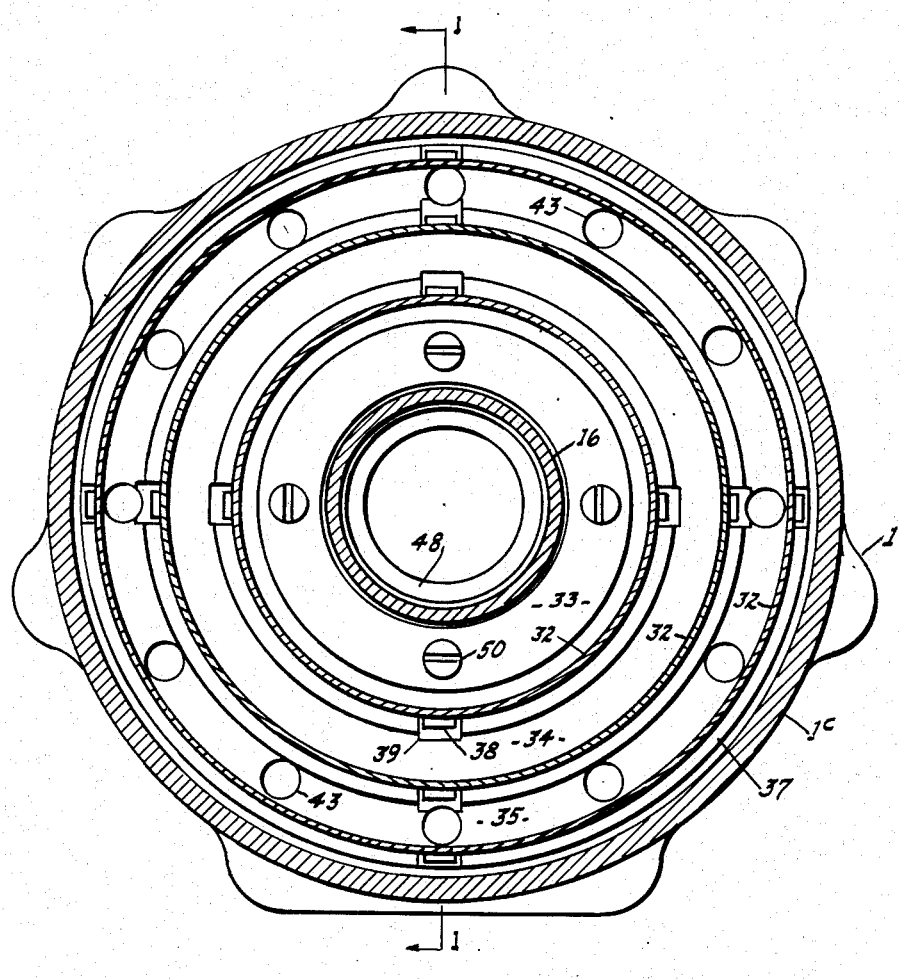

Figure 1 is a longitudinal sectional view of this oil filter construction taken on line 1—1, Figures 2, 3, 4 and 5.

Figures 2, 3, 4 and 5 are sectional views on line 2—2, 3—3, 4—4 and 5—5, respectively, Figure 1.

This filter construction comprises a casing 1 which is cylindrical in general form, the casing having a flange 2 by which it is secured, as by screws or bolts, to a support as the crank casing of the engine, a shaft 3 journalled in the casing 1 and extending coaxially thereinto, a pump or impeller, and a centrifugal filter drum mounted on the shaft in series so that the oil is forced from an entrance compartment to the impeller, and from the impeller to the drum where a portion of the oil is by-passed through filter chambers of the drum. The shaft 3 has means at its inner end for extending into the engine casing

2 for connection to gearing in the engine casing actuated by the crank shaft, the gearing being part of the gearing employed in engines to run accessories, etc. The shaft 3 is mounted in journal bearings 4, 5, suitably supported in partitions extending transversely of the casing 1. The casing is supported at its inner end in the wall of the engine casing. The outer end of the filter casing 1 is formed with a removable wall 6 in which the outer end of the drum is journalled in a bearing at 7, as will be hereinafter described.

The casing 1 is provided with an entrance compartment 8 having a laterally or radially extending inlet 9 which is coupled to a conduit leading from the engine base and through which the oil is forced by the oil pump of the engine. The entrance compartment is formed with a central passage 10 around the shaft 3, the walls of the passage 10 being radially spaced from the shaft 3. The passage 10 opens into the impeller compartment 11. The impeller 12 is located in the compartment 11 and is a centrifugal impeller and hence, throws the oil centrifugally outward. The casing is also formed with radial outlet passage sections 13 from the impeller compartment which communicate with inwardly converging outlet passage sections 14 opening into a central annular outlet 15 concentric with the shaft 3 and discharging into the inner end of a main axial outlet passage 16 of the filter drum, designated generally 17. The outer end of the main outlet passage 16 communicates with an outlet pipe coupled thereto as by a coupling 18 carried by the outer end wall of the casing 1, this coupling being secured to the wall 6 of the casing 1, as by studs and nuts 19, 19A. The coupling 18 may, however, be an integral part of the outer end wall 6. The outer wall 6 is demountable and is secured to the casing, as by studs 20 and nuts 20A. The passages 14 are formed by stationary vanes 14A which direct and distribute the rapidly whirling oil to the central outlet 15. The vanes 14A are spiral. Two of them are shown as cut by the section line 1—1, Figure 4, on which Figure 1 is taken. Upon the removal of the outer wall 6, the bearing 7 can be removed and the filter drum removed as a unit for soaking, or cleaning. The inner portion of the casing 1 at which the flange 2 is located, which flange is secured to the engine casing, is herein considered the inner or front end. The portion of the casing at which the removable wall 6 is located is considered herein as the outer or rear end. The entrance compartment 8, impeller compartment 11, and the compartment 21, in which the filter drum 17 is located, are thus connected in series from the inner end of the casing toward the outer end.

As here illustrated, the casing 1 is formed with an entrance section 1A, an intermediate section 1B, and a filter drum compartment section 1C, these sections providing transverse partition means which form the entrance compartment 8, impeller compartment 11, and the filter drum compartment 21, and the passages connecting them in series. The sections are secured together at their margins by studs 22 and nuts 22A. The section 1B is formed with a channel portion 23, Figure 2, which projects into the entrance compartment 8 and overhangs the radial entrance or inlet portion 9, this annular portion 23 being provided with a radial splitter 24 directed toward the inlet or entrance portion 9 to split the incoming oil into right and left streams, and also with deflectors 25 for distributing the oil in the two streams. Diametrically opposite the deflectors 25 are located another pair of oppositely disposed deflectors 26 which cause the two streams to be directed radially inward to the central outlet 10 into the central portion of the impeller chamber 11. The projecting channel portion 23 is formed with a bottom wall or septum 23A located to direct the two streams of oil from the deflectors 25, 26, inward into the central passage 10, Figures 1 and 2. The impeller chamber 11 is formed partly in the section 1B and partly in the front wall 27 of the section 1C which houses the filter drum 17. The outlet sections 13 are formed partly in the section 1B and partly in the inner wall 27 of the section 1C, and the converging outlet passage sections 14 are formed in the front wall 27 of the section 1C. The vanes 14A are in the outlet 14. Thus, the oil entering the inlet 9 of the entrance chamber is divided into two streams which are deflected without undue turbulence into the impeller chamber 11 and are discharged first radially outward and then radially inward into the outlet 15 into the main axial outlet 16 of the filter drum 17.

Te filter drum 17 is also mounted or coupled to the end of the shaft 3 to be rotated thereby and as here shown is coupled to the shaft 3 by a spider-like bracket 28 having a hub 29 slidably splined at 30 on the outer end of the shaft 3 so that the coupling and the drum can be shifted axially and detached from the shaft 3. This coupling carries a stream lined nose 31 extending part way into the main outlet 16 of the filter drum to avoid undue turbulence.

As here illustrated, the filter drum 17 is provided with a concentric series of annular or cylindrical partitions 32 which divide the interior of the drum into a series of concentric filter compartments 33, 34, 35. These partitions are interlocked at their ends with imperforate heads 36, 37, of the drum and, as here shown, the partitions 32 are formed with a set of angular lugs 38 at each end which extend between one set of spaced lugs 39 on each of the heads 36, 37, the sets of lugs being in effect driving lugs. The innermost chamber 33 communicates through inlets 40 opening into the main outlet 16 adjacent the inner head 36 of the drum, and has outlets 41 for its outer or rear end into the next outermost chamber 34, these outlets being inlets for the chamber 34, and the chamber 34 has outlets 42 through the partition thereof near the inner end of the partition into the outermost chamber 35. The outermost chamber 35 has outlets 43 into an annular outlet passage 46 formed in the removable outer end wall 6, this outlet passage 46 opening at 47 at intervals into the coupling 18 so that the oil by-passed through the filter chambers rejoins the main stream of oil through the outlet 16, at the outer end of the main outlet passage 16. The filter chambers 33, 34, 35, are provided with suitable filter or screening material, not shown.

The filter drum 17 is removable as a unit. As here shown, the wall of the main outlet 16 is secured, as by welding, to the bracket 28 and to an outlet nozzle 48 inserted in the outer end of the main outlet 16 of the drum. The inner head 36 of the drum is secured by a lock or thrust ring 49 to the inner end of the tubular main outlet wall 16, and the outer head 37 of the drum is secured to a flange on the nozzle 48, as by a screw 50.

The main portion of the oil say, for illustration 85%, passes directly through the main outlet 16, while a predetermined portion as, for example, 15% by-passes through the filter chambers 33, 34, 35, in a tortuous path and re-enters the main stream of oil through the outlet passage 46 in the removable rear wall 6 of the casing.

As is understood, it is necessary to remove the filter drum for cleaning and replacement at regular intervals in accordance with the time the engine, to which the filter is installed, is in use. In some installations, as in airplane engines, it is necessary to replace the filter drum at short intervals, as say ten hours. To remove the filter drum, the outer end wall 6 of the casing 1 is detached by unscrewing the nuts 20A, thus permitting the end wall 6 to be demounted. The filter drum can then be removed as a unit, the hub 29 of the coupling 28 sliding off the end of the shaft 3. In demounting the coupling, the bearing 7 can be removed by demounting the lock ring 55. A cleaned filter drum can be installed by the reversal of these operations.

The outlet pipe from the coupling leads to an oil cooler and then to a supply or sump from which the oil is fed to the regular fuel pump of the engine. The oil is forced by the fuel pump through the bearings and other parts to be lubricated of the engine and into the inlet 9 of the entrance chamber 8 of the casing and re-circulated.

The oil feeds into the inlet 9 of the entrance chamber 8 at a comparatively low pressure but, the boosting effect of the centrifugal impeller greatly facilitates the movement of the oil through the entrance compartment 8 and through the filter drum.

In operation, by this filter construction the oil passes from the entrance chamber inwardly to the center of the centrifugal impeller 11 where it is first thrown outwardly and then forced inward through the outlet 15 of the impeller chamber and into the tubular main outlet 16 of the filter drum. From the filter drum, a predetermined portion as, say 15% of the oil by-passes through the centrifugal filter drum in a tortuous path and then radially inward to rejoin the oil passed through the main outlet 16 at the outer end of the drum 17. By reason of the arrangement of the entrance, the impeller and the drum compartments and the impeller and the centrifugal drum being actuated by the power shaft 3, the oil is quickly and forcibly circulated and rapidly cleaned until the filter chambers become clogged and then the filter drum can be readily removed and cleaned and replaced, or replaced by a previously reconditioned filter drum.

What I claim is:

1. An oil filter construction comprising a fixed casing, a power actuated shaft in the casing, an impeller mounted on the shaft to rotate therewith, a centrifugal filter drum also mounted in the casing coaxial with the shaft and a coupling between the drum and the shaft whereby the drum is rotated by the shaft, the casing being formed with transverse partition means forming an entrance compartment for the oil, a compartment for enclosing the impeller, and passages connecting the entrance compartment and the impeller compartment and connecting the impeller compartment and the filter drum, the drum having a plurality of concentrically spaced apart cylindrical members forming concentric filter chambers, the innermost of said members forming a coaxial main outlet passage extending from said impeller compartment axially of the drum from end to end thereof, the outermost of said cylindrical members being imperforate and the remaining ones of said members being apertured to permit the flow of oil from said outlet passage through said filter chambers, said outer chamber being formed with a discharge aperture, and the casing being formed with an outlet passage arranged to receive the oil from said discharge aperture and direct it inwardly into the main outlet of the drum.

2. An oil filter comprising a fixed casing having means for connection to a support and being formed with a filter chamber, a power actuated shaft in the casing, an impeller mounted on the shaft to rotate therewith, a centrifugal filter drum mounted in the filter chamber of the casing in axial alinement with the shaft, a coupling between the drum and the shaft whereby the drum is rotated by the shaft, the casing being formed with transverse partition means enclosing an entrance compartment for the impeller, the partition means being formed to provide a central axial passage around the shaft and spaced therefrom connecting the entrance compartment with the impeller compartment and to provide a central outlet for the impeller compartment around the shaft and spaced radially therefrom and discharging coaxially into the drum, the impeller being a centrifugal impeller, the drum having a coaxial main outlet from end to end alined with the central outlet of the impeller compartment and concentric filter passages connected in series, said concentric filter passages being arranged about said coaxial outlet with the innermost filter passage communicating with the main outlet near the inner end thereof and the casing being formed with an outlet passage communicating with the outermost filter chamber to receive oil from the filter drum, the last mentioned passage extending radially inward and communicating with the main outlet of the drum.

3. An oil filter comprising a fixed casing having means for connection to a support and being formed with a filter chamber, a power actuated shaft in the casing, an impeller mounted on the shaft to rotate therewith, a centrifugal filter drum mounted in the filter chamber of the casing in axial alinement with the shaft, a coupling between the drum and the shaft whereby the drum is rotated by the shaft, the casing being formed with transverse partition means enclosing an entrance compartment for the impeller, the partition means being formed to provide a central axial passage around the shaft and spaced therefrom connecting the entrance compartment with the impeller compartment and to provide a central outlet for the impeller compartment around the shaft and spaced radially therefrom and discharging coaxially into the drum, the impeller being a centrifugal impeller, the drum having a coaxial main outlet from end to end alined with the central outlet of the impeller compartment and concentric filter passages connected in series, said concentric filter passages being arranged about said coaxial outlet with the innermost filter passage communicating with the main outlet near the inner end thereof and the casing being formed with an outlet passage communicating with the outermost filter chamber to receive oil from the filter drum, the last mentioned passage extending radially inward and communicating with the main outlet of the drum, the entrance compartment comprising an annular portion concentric with the shaft and a radial outwardly extending entrance portion, and the transverse partition means projecting into the annular entrance portion and provided with a splitter located to direct the incoming oil from the radial entrance of the entrance compartment in two streams and being also provided with deflectors located diametrically opposite the splitter for directing the oil inwardly into the central outlet connecting the entrance compartment and the impeller compartment.

4. An oil filter comprising a fixed casing having means for connection to a support and being formed with a filter chamber, a power actuated shaft in the casing, an impeller mounted on the shaft to rotate therewith, a centrifugal filter drum mounted in the filter chamber of the casing in axial alinement with the shaft, a coupling between the drum and the shaft whereby the drum is rotated by the shaft, the casing being formed with transverse partition means enclosing an entrance compartment for the impeller, the partition means being formed to provide a central axial passage around the shaft and spaced therefrom connecting the entrance compartment with the impeller compartment and to provide a central outlet for the impeller compartment around the shaft and spaced radially therefrom and discharging coaxially into the drum, the impeller being a centrifugal impeller, the drum having a coaxial main outlet from end to end alined with the central outlet of the impeller compartment and concentric filter passages connected in series, said concentric filter passages being arranged about said coaxial outlet with the innermost filter passage communicating with the main outlet near the inner end thereof and the casing being formed with an outlet passage communicating with the outermost filter chamber to receive oil from the filter drum, the last mentioned passage extending radially inward and communicating with the main outlet of the drum, the entrance compartment comprising an annular portion concentric with the shaft and a radial outwardly extending entrance portion, and the transverse partition means projecting into the annular entrance portion and provided with a splitter located to direct the incoming oil from the radial entrance of the entrance compartment in two streams and being also provided with deflectors located diametrically opposite the splitter for directing the oil inwardly into the central outlet connecting the entrance compartment and the impeller compartment, said portion of the partition means, which projects into the entrance compartment, also being formed with a bottom wall inclining to converge inwardly into said central outlet connecting the entrance compartment and the impeller compartment.

5. An oil filter comprising a fixed casing having means for connection to a support and being formed with a filter chamber, a power actuated shaft in the casing, an impeller mounted on the shaft to rotate therewith, a centrifugal filter drum mounted in the filter chamber of the casing in axial alinement with the shaft, a coupling between the drum and the shaft whereby the drum is rotated by the shaft, the casing being formed with transverse partition means enclosing an entrance compartment for the impeller, the partition means being formed to provide a central axial passage around the shaft and spaced therefrom connecting the entrance compartment with the impeller compartment and to provide a central outlet for the impeller compartment around the shaft and spaced radially therefrom and discharging coaxially into the drum, the impeller being a centrifugal impeller, the drum having a coaxial main outlet from end to end alined with the central outlet of the impeller compartment and concentric filter passages connected in series, the innermost filter passage communicating with the main outlet near the inner end thereof and the casing being formed with an outlet passage communicating with the outermost filter chamber to receive oil from the filter drum, the last mentioned passage extending radially inward and communicating with the main outlet of the drum, the passages in the transverse partition means which connects the impeller compartment and the central outlet thereof into the filter drum comprising a radial outlet section into which the oil is thrown centrifugally and an inward extending section to the central outlet of the impeller compartment.

6. An oil filter comprising a fixed casing having means for connection to a support and being formed with a filter chamber, a power actuated shaft in the casing, an impeller mounted on the shaft to rotate therewith, a centrifugal filter drum mounted in the filter chamber of the casing in axial alinement with the shaft, a coupling between the drum and the shaft whereby the drum is rotated by the shaft, the casing being formed with transverse partition means enclosing an entrance compartment for the impeller, the partition means being formed to provide a central axial passage around the shaft and spaced therefrom connecting the entrance compartment with the impeller compartment and to provide a central outlet for the impeller compartment around the shaft and spaced radially therefrom and discharging coaxially into the drum, the impeller being a centrifugal impeller, the drum having a coaxial main outlet from end to end alined with the central outlet of the impeller compartment and concentric filter passages connected in series, the innermost filter passage communicating with the main outlet near the inner end thereof and the casing being formed with an outlet passage communicating with the outermost filter chamber to receive oil from the filter drum, the last mentioned passage extending radially inward and communicating with the main outlet of the drum, the passages in the transverse partition means which connects the impeller compartment and the central outlet thereof into the filter drum comprising a radial outlet section into which the oil is thrown centrifugally and an inward extending section to the central outlet of the impeller compartment, the last sections of said passages being provided with vanes therein to distribute the oil passing therethrough to the central outlet of the impeller compartment.

7. An oil filter construction comprising a fixed casing having means for securement to a support and being formed with a filter chamber, and having a removable wall, a power actuated shaft journalled in the casing, the casing having an oil entrance compartment at one end, an intermediate impeller compartment and a centrifugal filter drum at its other end, a centrifugal impeller mounted on the shaft to rotate therewith in the impeller compartment, a centrifugal drum mounted on the shaft in the drum compartment and a coupling between the drum and the shaft whereby the drum is rotated by the shaft, the casing being formed with transverse partition means forming the entrance compartment for the oil, a compartment for enclosing the impeller, the partition means being also formed with an outlet passage connecting the entrance and the impeller compartments, and with an outlet passage for the impeller compartment located to discharge axially into one end of the drum, the coupling being a slip coupling slidably keyed on the end of the shaft, the drum having concentric filter passages connected in series and a main axial outlet from end to end of the drum, the innermost filter passage communicating with the main outlet of the drum at the inner end of the drum, and the casing being also formed with an outlet passage communicating with the outermost filter chamber of the drum to direct the oil inward, the last outlet passage communicating with the main outlet of the drum at the outer end of the drum whereby, when the outer end wall of the casing is removed, the filter drum can be removed and replaced as a unit.

8. An oil filter construction comprising a fixed casing and a power actuated shaft journalled in the casing, the casing having means at one end for attachment to a support, the casing being formed in three sections providing transverse partition means for forming an entrance compartment for the oil, an impeller compartment and a filter drum compartment, and the filter drum compartment being provided with a removable wall at the other end of the casing, a part of said partition means being an end wall in the inner end of the filter drum compartment section, said partition means being also formed with an inlet between the entrance compartment and the impeller compartment and an outlet from the impeller compartment to the filter drum compartment, the drum having a central main tubular outlet from end to end thereof and concentric filter passages connected in series around the main outlet, the innermost filter passage communicating with the main outlet at the inner end of the main outlet; said removable other end wall of the casing having an outlet passage communicating with the outermost filter chamber and extending inwardly toward the main outlet of the drum, journal bearings for the shaft in said partition means, and a journal bearing between said removable other end wall of the casing and the tubular wall of the main outlet, a slip coupling between the tubular main outlet of the drum and the shaft, the coupling being slidably keyed to the end of the shaft whereby, upon removal of the end wall at the outer end of the drum compartment, the filter drum can be removed and replaced as a unit.

9. An oil filter comprising a fixed casing, a power actuated shaft journalled in the casing, the casing having an oil entrance compartment, an impeller compartment, and a centrifugal filter drum compartment connected in series, a centrifugal impeller mounted on the shaft to rotate therewith in the impeller compartment, and a centrifugal filter drum mounted on the shaft in the drum compartment, the entrance compartment having an axial opening around the shaft into the impeller compartment, the casing having passages from the impeller compartment and leading therefrom radially inward to discharge coaxially into one end of a main outlet of the filter drum, the filter drum having said tubular main axial outlet from end to end and a series of annular radially spaced concentric partitions forming filter chambers around the main outlet, each chamber having an outlet at one end into the next outer chamber and also the outlets of alternate chambers being located at like ends of the drum, and the outlets of the other chambers at the opposite end of the drum, the innermost chamber having an inlet into the main outlet of the drum, the casing being formed with a discharge passage common to the outlets of the outermost filter chamber and extending radially inward into the main outlet of the drum.

10. An oil filter comprising a fixed casing having an oil entrance compartment and a centrifugal filter drum compartment, a power actuated shaft journalled in the oil entrance compartment, a centrifugal filter drum journalled in said filter compartment in coaxial registration with said shaft and being operatively connected thereto whereby the drum is rotated by the shaft, said drum including a plurality of cylindrical members arranged in concentrically spaced relation forming concentrically spaced filter chambers, the innermost cylindrical member forming a discharge outlet extending from the inner end of the drum to the outer end thereof, an oil pump operatively connected to said shaft and having a discharge outlet connected to the inner end of said inner cylindrical member of the filter drum and to the inner filter chamber thereof, the outermost of said tubular members being imperforate and the intermediate tubular members being apertured to permit the flow of oil outwardly from the innermost chamber to the outermost chamber, said outermost chamber having a discharge outlet extending radially inwardly and communicating with said discharge outlet.

11. An oil filter comprising a fixed casing having an oil entrance compartment and a centrifugal filter drum compartment, a power actuated shaft journalled in the oil entrance compartment and extending into said filter drum compartment, an end wall detachably secured to the outer end of said filter drum compartment, a centrifugal filter drum arranged in said filter drum compartment and being journalled at its outer end with said end wall and being detachably connected at its inner end to said shaft, whereby the drum is rotated by the shaft, said drum including inner and outer end walls and a plurality of cylindrical members arranged in concentrically spaced relation between said end walls and forming, in conjunction therewith, concentrically spaced filter chambers, the innermost cylindrical member forming a discharge outlet passage extending from the inner end of the drum through said outer wall, an oil pump operatively connected to said shaft and having a discharge outlet connected to the inner end of said inner cylindrical member and to the inner chamber thereof, the outermost of said tubular members being imperforate and the intermediate tubular members being apertured to permit the flow of oil outwardly from the innermost chamber to the outermost chamber, said outermost chamber having a discharge outlet extending radially inwardly and communicating with said discharge outlet passage.

GEORGE T. BYNUM.

References Cited in the file of this patent

UNITED STATES PATENTS

| Number | Name | Date |
|---|---|---|
| 1,262,146 | Ward | Apr. 9, 1918 |
| 1,767,314 | Schmitz | June 24, 1930 |
| 2,515,398 | Derocher | July 18, 1950 |